(12) United States Patent
Grzonka

(10) Patent No.: US 8,707,421 B2
(45) Date of Patent: Apr. 22, 2014

(54) SYSTEM AND METHOD FOR A WEB BASED TELESERVICE FOR UPDATING MACHINE SOFTWARE

(75) Inventor: Holger Grzonka, Alpharetta, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 1375 days.

(21) Appl. No.: 12/144,782

(22) Filed: Jun. 24, 2008

(65) Prior Publication Data

US 2009/0007255 A1   Jan. 1, 2009

Related U.S. Application Data

(60) Provisional application No. 60/947,079, filed on Jun. 29, 2007.

(51) Int. Cl.
| | | |
|---|---|---|
| *G06F 9/44* | (2006.01) | |
| *G06F 9/445* | (2006.01) | |
| *G06F 11/14* | (2006.01) | |
| *G06F 21/57* | (2013.01) | |
| *H04L 29/08* | (2006.01) | |
| *H04L 29/06* | (2006.01) | |

(52) U.S. Cl.
CPC ............. *G06F 8/65* (2013.01); *G06F 11/1433* (2013.01); *G06F 21/572* (2013.01); *H04L 29/08981* (2013.01); *G06F 2221/2119* (2013.01); *H04L 63/0272* (2013.01); *H04L 63/029* (2013.01)
USPC .......................................................... 726/15

(58) Field of Classification Search
USPC ........................................................... 726/15
See application file for complete search history.

(56) References Cited

U.S. PATENT DOCUMENTS

| | | | |
|---|---|---|---|
| 2003/0120502 A1* | 6/2003 | Robb et al. .................... | 705/1 |
| 2003/0188306 A1* | 10/2003 | Harris et al. .................. | 717/174 |
| 2004/0171369 A1* | 9/2004 | Little et al. .................... | 455/410 |
| 2005/0137997 A1* | 6/2005 | Bussert et al. ................. | 707/1 |
| 2007/0185685 A1* | 8/2007 | Lannes et al. ................. | 702/184 |

\* cited by examiner

*Primary Examiner* — William Goodchild

(57) ABSTRACT

A system and method for maintaining a machine control program includes a machine controller including a machine program stored on computer media and configured to control a machine. A router is coupled to the machine controller. A server is coupled to the router to establish communications between the machine controller and an entity that provides source file updates or changes to the machine program such that the server hosts application software needed to compile the source file updates or changes wherein compiled source files are accessible by the machine controller over a secure link to the server.

19 Claims, 5 Drawing Sheets

SYSTEM AND METHOD FOR A WEB BASED TELESERVICE FOR UPDATING MACHINE SOFTWARE

CROSS-REFERENCE TO RELATED APPLICATIONS

This application claims the benefit of U.S. Provisional Application Ser. No. 60/947,079, filed Jun. 29, 2007, which is incorporated herein by reference in its entirety.

BACKGROUND

1. Technical Field

This disclosure relates to improved updating for software controlled machines, and more particularly, to a system and method for a secure communication tunnel between an information source and a user for more accessible and up-to-date software maintenance of software controlled machines.

2. Description of the Related Art

Software maintenance for software based machines in the field is often difficult and may lead to costly downtime for manufacturing processes. Machine manufacturers often provide updates to system software at inconvenient times or provide patches that need to be downloaded and installed on machine controller computers to fix bugs or the like. A typical maintenance sequence for updating software needed for industrial machines is depicted in FIG. 1.

Referring to FIG. 1, engineering software 10 includes source files 12 needed for controlling an industrial controller or computer 14. The source files 12 are first changed or updated on an engineering computer 16. The engineering computer 16 compiles the source files 12. Next, the engineering computer 16 connects to the industrial controller 14. The industrial controller 14 downloads a compiled program 18 (compiled source files) so that the industrial controller 14 can be employed to run a computer controlled device or machine 20.

The source files 12 must be made available to the engineering computer 16 as the source files 12 are not available in a previous version of the compiled program. Updating the industrial controller 14 therefore represents down time for a system 22, which usually equates to loss of profits or efficiency.

The engineering computer 16 may be located on site or remotely from the system 22. The engineering computer 16 is almost always within a user's firewall. When the engineering computer 16 is on site, the source files 12 must be made available to the engineering computer 16. If the engineering computer connects remotely to the system 22, the connection may not be secure and cannot go through firewalls.

SUMMARY

In accordance with present embodiments, the systems and methods of the present invention provide at least some of the following advantages: (1) make an update process more reliable and shortens the time to locate failures and fix them; (2) address security concerns regarding incoming remote access requests; (3) provide a backup strategy in a central location; (4) relieve the machine user from buying and installing engineering software and/or (5) make copies of different engineering software releases available.

A system and method for maintaining a machine control program includes a machine controller including a machine program stored on computer media and configured to control a machine. A router is coupled to the machine controller. A server is coupled to the router to establish communications between the machine controller and an entity that provides source file updates or changes to the machine program. The server hosts application software needed to compile the source file updates or changes wherein compiled source files are accessible by the machine controller over a secure link to the server.

A method for maintaining a machine control program includes hosting application software at a tele service server (TSS) used in compiling a new version of a source file generated by an entity that provides source file updates or changes where a compiled source file is employed to operate a machine controller that is remotely disposed relative to the entity; establishing a secure communications link between the machine controller at a machine user's location and the TSS, the machine controller including a machine program stored on computer media and configured to control a machine using the machine program; and updating the machine program in accordance with the entity by receiving compiled source files from the TSS.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

Figure 1:
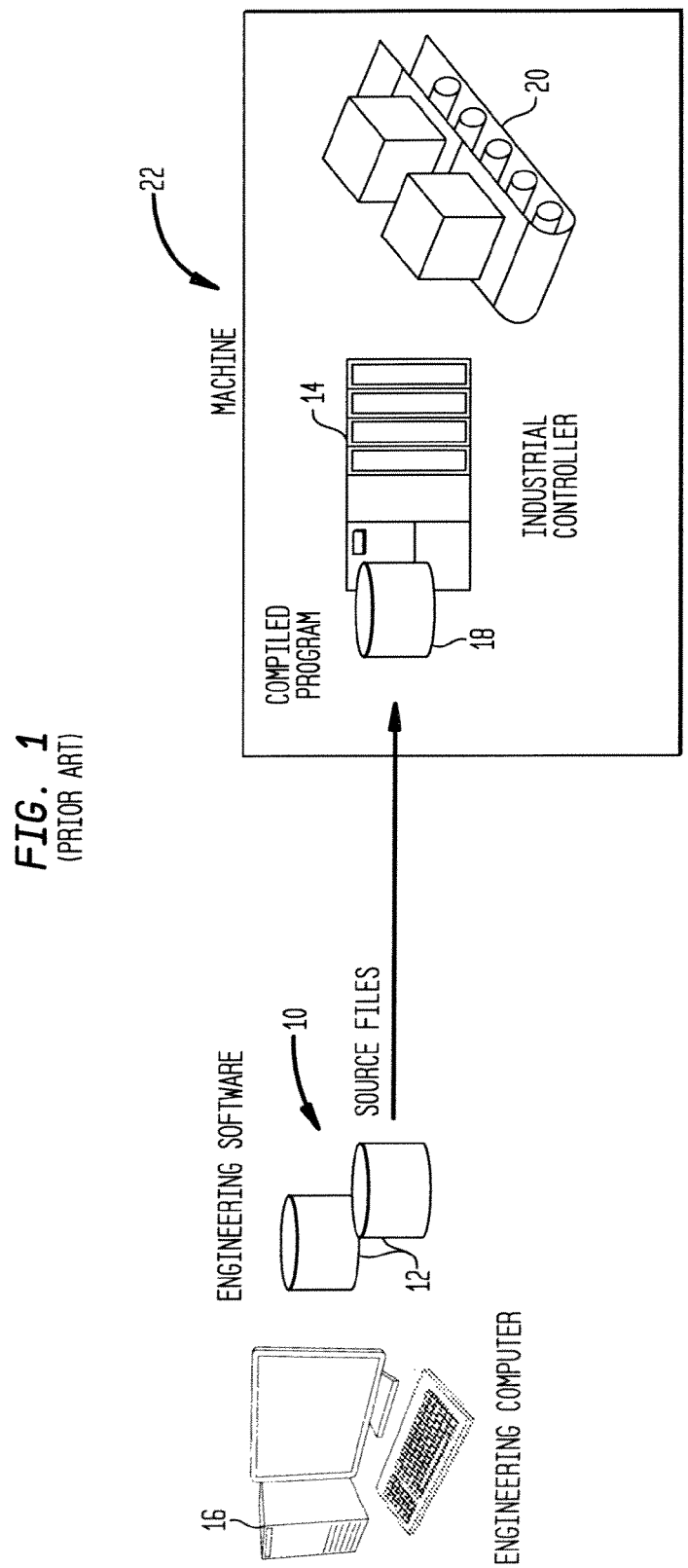
FIG. 1 is a diagram showing a conventional software maintenance update for a machine controller at a user's location where an engineering computer is on-site to compile source files.

The present invention provides remote and secure software maintenance services from a machine manufacturer to a machine user. A virtual private network (VPN) router or the like, at the machine user's location, establishes an outgoing transfer protocol connection (e.g., https) to a server, e.g., a Tele Service Server (TSS). The network traffic from machine manufacturer to machine user is tunneled through a safe and secure VPN connection. The connection is routed through and authenticated by the server (e.g., TSS). A machine as referred to herein includes, e.g., a software controlled industrial machine used in manufacturing, assembly or processing.

Advantageously, a machine user's firewall does not have to be opened for incoming connections, and may be left in place during secure communications. In addition, multiple machine vendors can use the TSS as an entry point for tele service with different end users so that the secure connection may be employed to maintain software on multiple machines at a user location by multiple entities. The various connections to the different end user sites are managed by the TSS. This reduces configuration effort and ensures that the machines have access to the most up-to-date software.

The present invention facilitates on-site service. In one embodiment, a standard PC with a web browser may be employed to change a machine program at the user's location. Neither the engineering system nor the licenses have to be installed at the machine user's location. This reduces or eliminates the need for the machine user to have to install software for updates. The most current engineering software version is made available on the TSS, therefore, no need for updating the engineering software is necessary.

With conventional systems and methods of service work, source files are not usually available at the machine, or the source files do not match the program in a controller. This could lead to costly down time and service failures. The present invention enables successful service work, since the source files are always available on the TSS. After a successful program download to the controller, the current source file may be stored on the server. Hence, the source files are always backed up.

The present invention will be described in terms of illustrative embodiments. It should be understood that the present invention is not limited to these illustrative examples and may be employed with other systems and methods where updated information for industrial machines, appliance or computer controlled devices can be made available at a local site from a remote site without compromising security.

It should be understood that the elements shown in the figures may be implemented in various forms of hardware, software or combinations thereof. Preferably, these elements are implemented in a combination of hardware and software and may include one or more appropriately programmed general purpose digital computers having a processor and memory and input/output interfaces.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the diagrams presented herein represent conceptual views of illustrative system components and/or circuitry embodying the principles of the invention. Similarly, it will be appreciated that any flow charts, block diagrams, and the like represent various processes which may be substantially represented in computer readable media and so executed by a computer or processor, whether or not such computer or processor is explicitly shown.

Figure 2:
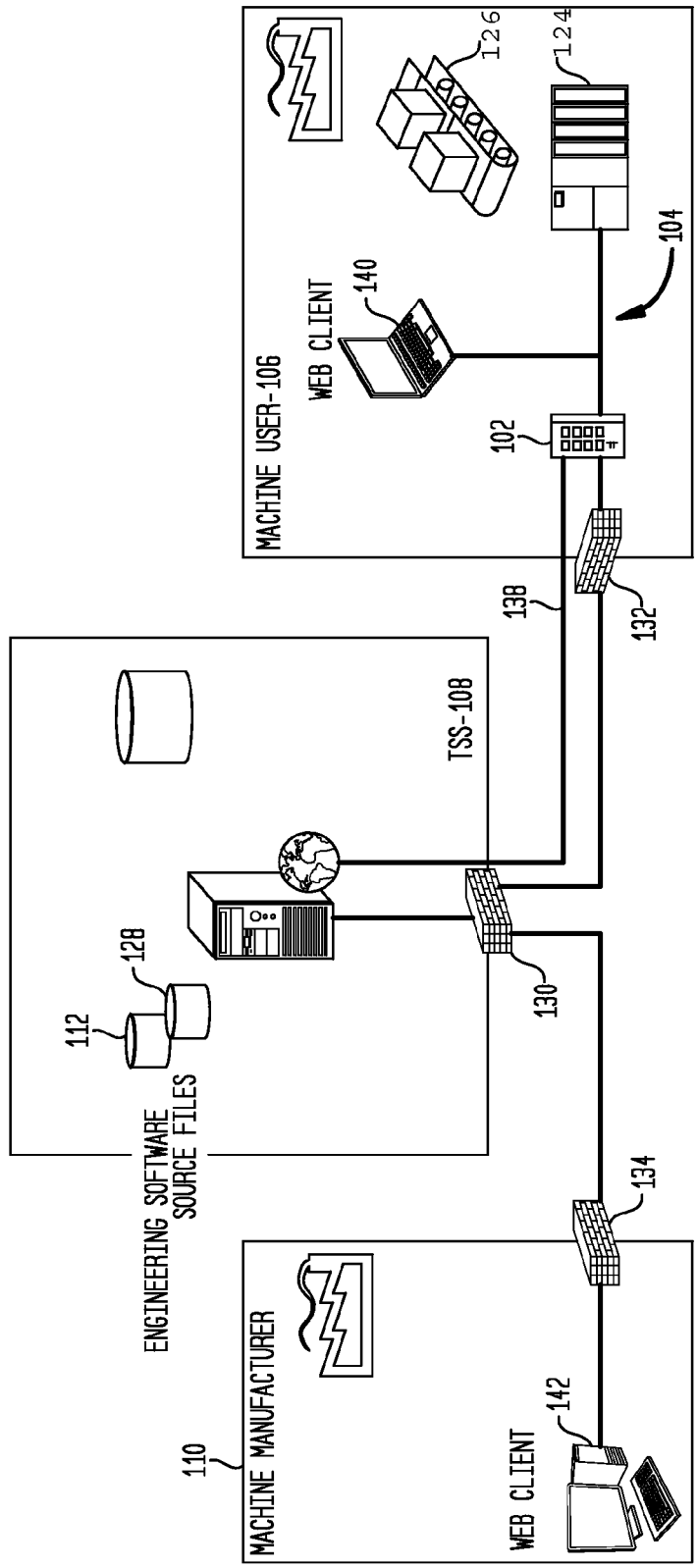
FIG. 2 is a diagram showing a system for remote and secure software maintenance of machine controller software including compiling, storing and backing up source files for the machine on a server for constant access in accordance with the present principles.

Referring now in specific detail to the drawings in which like reference numerals identify similar or identical elements throughout the several views, and initially to FIG. 2, a system 100 for making source files and software maintenance updates available for machines at a machine user's location is illustratively depicted in accordance with one embodiment. A router 102, e.g., a virtual private network (VPN) router for a network 104 at a machine user's location may be employed to connect to a central server 108, such as a tele service server (TSS). TSS 108 establishes a connection between a machine manufacturer 110 and a machine user's location 106 and hosts engineering software 112.

The engineering software 112 may include an engineering software application employed in configuring, controlling or operating a machine at a user's location 106. Engineering software 112 titles may include specialized software designed for computer driven machining applications, assembly line manufacturing, environmental control, data acquisition, etc.

The TSS 108 stores and/or backs up source files (and executables) 128 for a machine program used by the machine user at location 106 to operate a machine 126. A service engineer or personnel at the machine user location 106 is permitted to use engineering software 112 available on the TSS 108 and to use source files 128 and to download programs to a user machine controller 124.

The controller 124 is preferably employed to control machine(s) 126. Machine 126 may be any software controlled machine, such as for example, a conveyor, a molding machine, an inspection machine, a welding machine, a robot, a positioning system, or any other electronic, mechanical or electromechanical machine or other device or apparatus. The machine manufacturer 110 may include the actual manufacturer or a servicing company, maintenance company or the like. In the present instance, machine manufacturer 110 represents an entity that provides changes, updates, patches or the like needed to operate, update or maintain software employed by the machine user at location 106 in controller 124 or other software processing device. The machine control program includes executable code to operate the machine or machines.

There are several techniques for maintaining control or machine programs on machines in the field. Two of these include Internet based tele service, which uses a direct network connection between the machine manufacturer and the machine user. In conventional cases, security policies often deny incoming connections and do not permit the opening of special ports. Different machine manufacturers require different security settings at a machine user's firewall, and a machine manufacturer must set up the connection to every machine user site.

A second technique includes on site servicing of the machine through a serviceman. In a conventional system, a personal computer (PC) with installed engineering software (and license keys) on site are needed. Source files for the machine program on the PC are required. Conventional service work can fail because the source files are not available at the machine or the source files do not match the program in the controller.

In accordance with the present principles, a VPN connection between machine user 106 and TSS 108 establishes a secure connection between machine manufacturer 110 and machine user 106. TSS 108 permits a connection to the machine user 106 (or controller 124) over a secure transfer protocol link, preferably a hypertext transfer protocol over secure socket layer (https) link preferably through a VPN router 102. This connection goes through a user's firewall 132 without the need for altering the firewall 132 or the firewall settings. This connection is secure. TSS 108 preferably includes a firewall 130 that permits only secure https incoming connections with password protection or other security measures.

Https refers to a combination of normal http interactions over an encrypted secure sockets layer (SSL) or transport layer security (TLS) connection. This ensures reasonable protection from eavesdroppers, man-in-the-middle attacks and other intrusions. An https URL may specify a TCP port; if it does not, the connection uses a default port "443" (unsecured HTTP typically uses port "80"). To prepare a web-server for accepting https connections an administrator creates a public key certificate for a web-server. This certificate is signed by a certificate authority (e.g., TSS 108), which certifies that the certificate holder is the entity that it claims to be. While https is illustratively described herein, other suitable transfer protocols may be employed and may include, e.g., secure file transfer protocol (SFTP), FTP/SSL, etc.

The VPN router 102 preferably permits only outgoing connections to prevent intrusions of the machine user's network 104. The VPN router 102 enables a permanent or part-time VPN connection 138 to TSS 108. Advantageously, the VPN connection 138 can be employed to tunnel information from machine manufacturer 110 to machine user 106, and TSS 108 authenticates and manages each connection. Machine manufacturer 110 may also include a firewall 134 which may be employed for security as is known.

In one embodiment, TSS 108 hosts the engineering software 112 to permit tele service with one or more a web clients 140 and 142. Web clients 142 and 140 may include, e.g., a client at a machine manufacturer's location and/or a client at a machine user's site. Engineering software 112 may be executed on TSS 108 to permit compilation of source files to form a compiled program for use by a controller or computer device at the web client's location. The web client's 140 and 142 can connect to the engineering software 112 in the TSS 108 for updates or changes.

By compiling or running the engineering software 112 at TSS 108, computing resources may be saved at the web client's locations. In addition, a common platform is employed for all web client's 140 and 142 to have up-to-date versions of the engineering software 112 since TSS 108 is controlled or maintained by a service provider of the engineering software 112. When changes or updates are needed, these are provided directly to the TSS 108 by another entity (e.g., the manufacturer), and the software is automatically updated and made available to all authorized web clients.

The source files 128 for the machine are preferably stored on TSS 108 so that the source files are accessible at anytime by the user (e.g., a service person performing repairs outside of normal business hours can have access to source files at anytime). TSS 108 may also be configured to provide a backup service for previous versions of software used to operate machine controller or the like.

Figure 3:
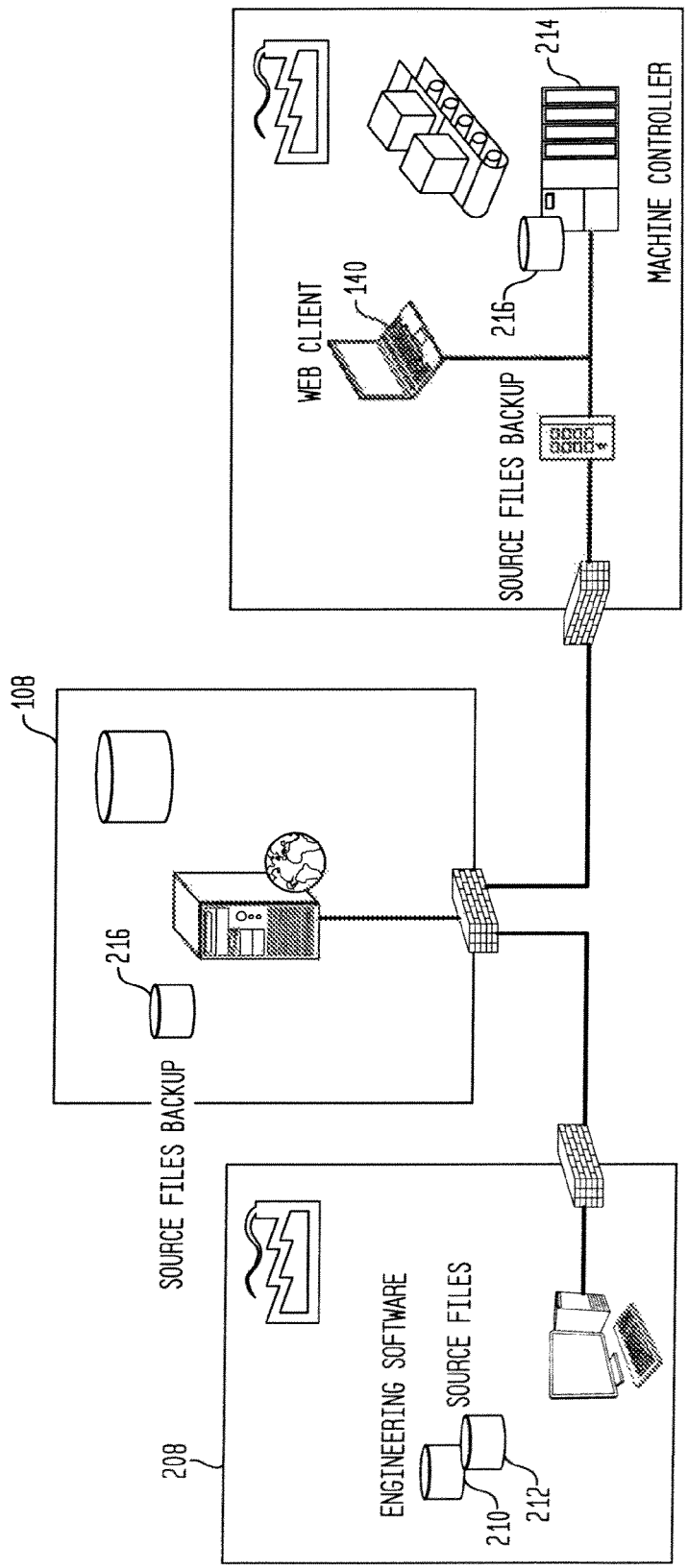
FIG. 3 is a diagram showing the system of FIG. 2 for updating source files initiated by a machine manufacturer or other entity through a secure connection or link and backing up previous versions of the source files at a server and/or at a user's location.
Figure 4:
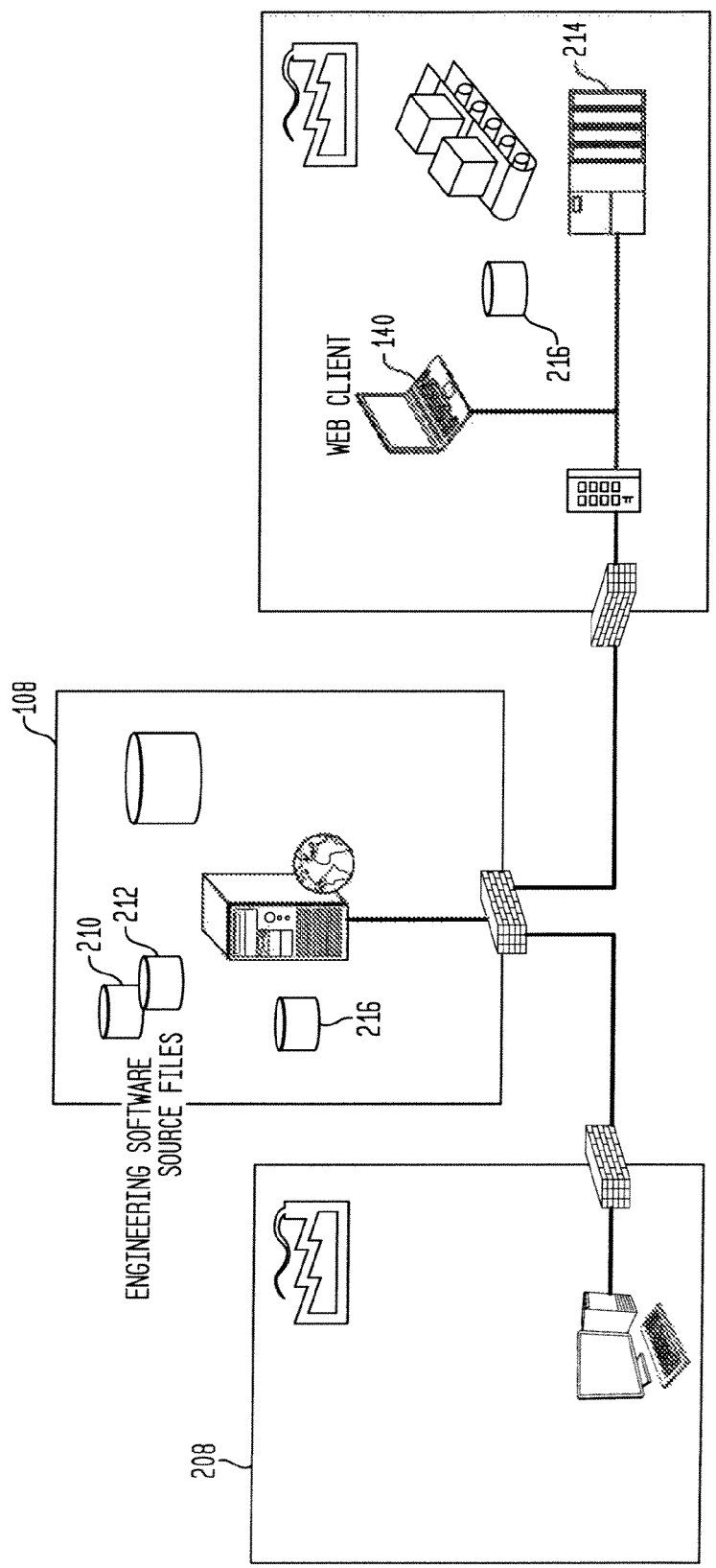
FIG. 4 is a diagram showing the system of FIG. 2 for updating source files initiated by a TSS through a secure connection or link and backing up previous versions of the source files at the TSS and/or at a user's location.

Referring to FIGS. 3 and 4, backup versions of source files are made which may be initiated by an update notification to TSS 108 or by a manufacturer 208. An automatic engineering software update/change may be provided on TSS 108 or based on updates/changes from a machine manufacturer or other entity 208. In one embodiment in accordance with FIG. 3, engineering software 210 at a machine manufacturer's location is updated or changed. This may include updates or changes to source files 212. The updates or changes are pushed to TSS 108 which backs up a previous version of the source files 212 (and/or engineering software 210). In addition, an automatic backup of source files 212 of the previous version at the user's locations may be performed. This may include a backup 216 of a current machine program of a machine controller 214 at the machine user's location and/or at TSS 108. The backup version is stored at TSS 108 and at the machine user's location using a web client 140.

In another embodiment in accordance with FIG. 4, engineering software 210 at TSS 108 is updated or changed. This may include updates or changes to source files 212. The updates or changes are presented to a user's machine or machine controller 214 which backs up a previous version of the source files 212 (and/or engineering software 210). In addition, an automatic backup of source files 212 of the previous version at TSS 108 may be performed. A backup version 216 is stored at TSS 108 and/or at the machine user's location using a web client 140.

An automatic backup of a last compiled source file 212, on TSS 108 and/or on machine controller 214 may be performed where the new source files are generated using an engineering system at the machine manufacturer 208 or generated by TSS 108.

Figure 5:
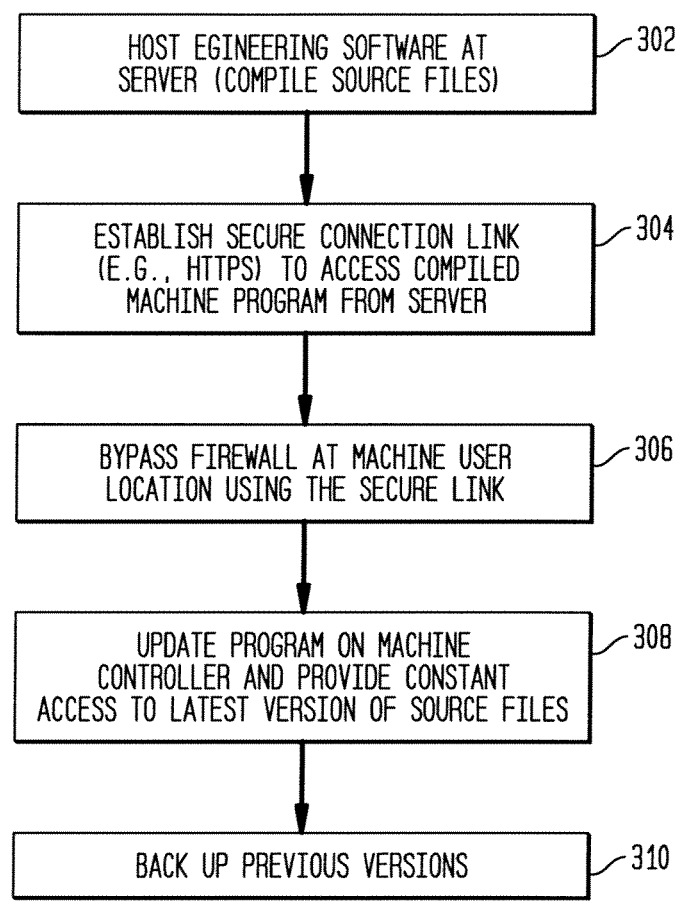
FIG. 5 is a block/flow diagram showing a system/method for maintaining software in accordance with the present principles.

Referring to FIG. 5, a method for maintaining a machine control program and/or maintaining software for machines is illustratively depicted in accordance with one illustrative embodiment. In block 302, application software or engineering software is hosted by a server, such as a TSS. The TSS is employed in compiling a new version of a source file generated by an entity that provides source file updates or changes where a compiled source file is employed to operate a machine controller that is remotely disposed relative to the entity. In block 304, a secure communications link is established between the machine controller at a machine user's location and the TSS, the machine controller including a machine program stored on computer media and configured to control a machine using the machine program. The secure communications link preferably includes a secure hypertext transfer protocol (e.g., https) link in a virtual private network at the machine user's location. In block 306, a firewall configured to protect the machine controller is bypassed wherein a virtual private network router establishes an outgoing hypertext transfer protocol (e.g., https) connection to the TSS, and network traffic to the machine controller is tunneled through a secure VPN connection while the firewall remains closed to incoming connections.

In block 308, the machine program is updated in accordance with the entity by receiving compiled source files as permitted by the TSS. Constant access to the latest version of source files or the compiled program is provided. In block 310, a previous version of the compiled source file is backed up at the TSS and/or at the user location.

Having described preferred embodiments for system and method for a web based tele service for updating machine software (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A system for maintaining a machine control program, comprising:
a machine controller including a machine program stored on computer media and configured to control a machine;
a router coupled to the machine controller; and
a server remotely disposed from and coupled to the router to establish communications between the machine controller and an entity that provides source file updates or changes to the machine program such that the server hosts application software that is needed to compile the source file updates or changes wherein compiled source files are stored at the server and accessible by the machine controller over a secure link to the server, wherein the server includes a tele service server (TSS) and the TSS authenticates communications between the entity and the machine controller.

2. The system as recited in claim 1, wherein the machine program includes executable code to operate a machine.

3. The system as recited in claim 1, wherein the router includes a virtual private network (VPN) router and the secure link includes a hypertext transfer protocol over secure socket layer (https) link.

4. The system as recited in claim 3, further comprising a firewall configured to protect the machine controller wherein the router establishes an outgoing https connection to the server and network traffic to the machine controller is tunneled through a secure VPN connection while the firewall remains closed to incoming connections.

5. The system as recited in claim 1, wherein the TSS is an entry point for service between a plurality of end users and manages connections to the plurality of end users to reduce configuration effort.

6. The system as recited in claim 1, wherein the TSS backs up a previous version of source files before a new version is installed in the machine controller.

7. The system as recited in claim 1, wherein the machine controller backs up a previous version of source files before a new version is installed thereon.

8. The system as recited in claim 1, wherein the entity that supplies source file updates includes one of a service entity and the server.

9. A system for maintaining a machine control program, comprising:
a machine at a user location controlled by a machine controller including a machine program stored on computer media;
a virtual private network (VPN) router coupled to the machine controller; and
a tele service server (TSS) coupled to the VPN router to permit a secure transfer protocol connection to the machine controller such that an entity that provides source file updates or changes to the machine program to cause the machine controller to access compiled source file updates or changes from the TSS which hosts application software needed to compile the source file updates or changes wherein the compiled source files are stored at the TSS and accessible by the machine controller over the secure transfer protocol connection.

10. The system as recited in claim 9, wherein the secure transfer protocol includes a hypertext transfer protocol over secure socket layer (https).

11. The system as recited in claim 9, further comprising a firewall configured to protect the machine controller wherein the VPN router establishes an outgoing https connection to the TSS and network traffic to the machine controller is tunneled through a secure VPN connection while the firewall remains closed to incoming connections.

12. The system as recited in claim 9, wherein the TSS authenticates communications between the entity and the machine controller.

13. The system as recited in claim 9, wherein the TSS is an entry point for service between a plurality of end users and manages connections to the plurality of end users to reduce configuration effort.

14. The system as recited in claim 9, wherein the TSS backs up a previous version of source files before a new version is installed in the machine controller.

15. The system as recited in claim 9, wherein the entity that supplies source file updates includes one of a service entity and the server.

16. A method for maintaining a machine control program, comprising:
hosting application software at a tele service server (TSS) used in compiling a new version of a source file stored at the TSS, the new version of the source file generated by an entity that provides source file updates or changes where a compiled source file is employed to operate a machine controller that is remotely disposed relative to the entity;
establishing a secure communications link between the machine controller at a machine user's location and the TSS, the machine controller including a machine program stored on computer media and configured to control a machine using the machine program; and
updating the machine program in accordance with the entity by receiving compiled source files from the TSS.

17. The method as recited in claim 16, further comprising backing up a previous version of the compiled source file.

18. The method as recited in claim 16, wherein establishing a secure communications link includes establishing a hypertext transfer protocol over secure socket layer (https) link in a virtual private network at the machine user's location.

19. The method as recited in claim 16, further comprising bypassing a firewall configured to protect the machine controller wherein a virtual private network router establishes an outgoing hypertext transfer protocol over secure socket layer (https) connection to the TSS, and network traffic to the machine controller is tunneled through a secure VPN connection while the firewall remains closed to incoming connections.

* * * * *